Sept. 23, 1969   M. S. PAPADOPULOS   3,469,014
CONNECTIONS FOR HOLLOW ELECTRIC CONDUCTORS
Filed May 23, 1967
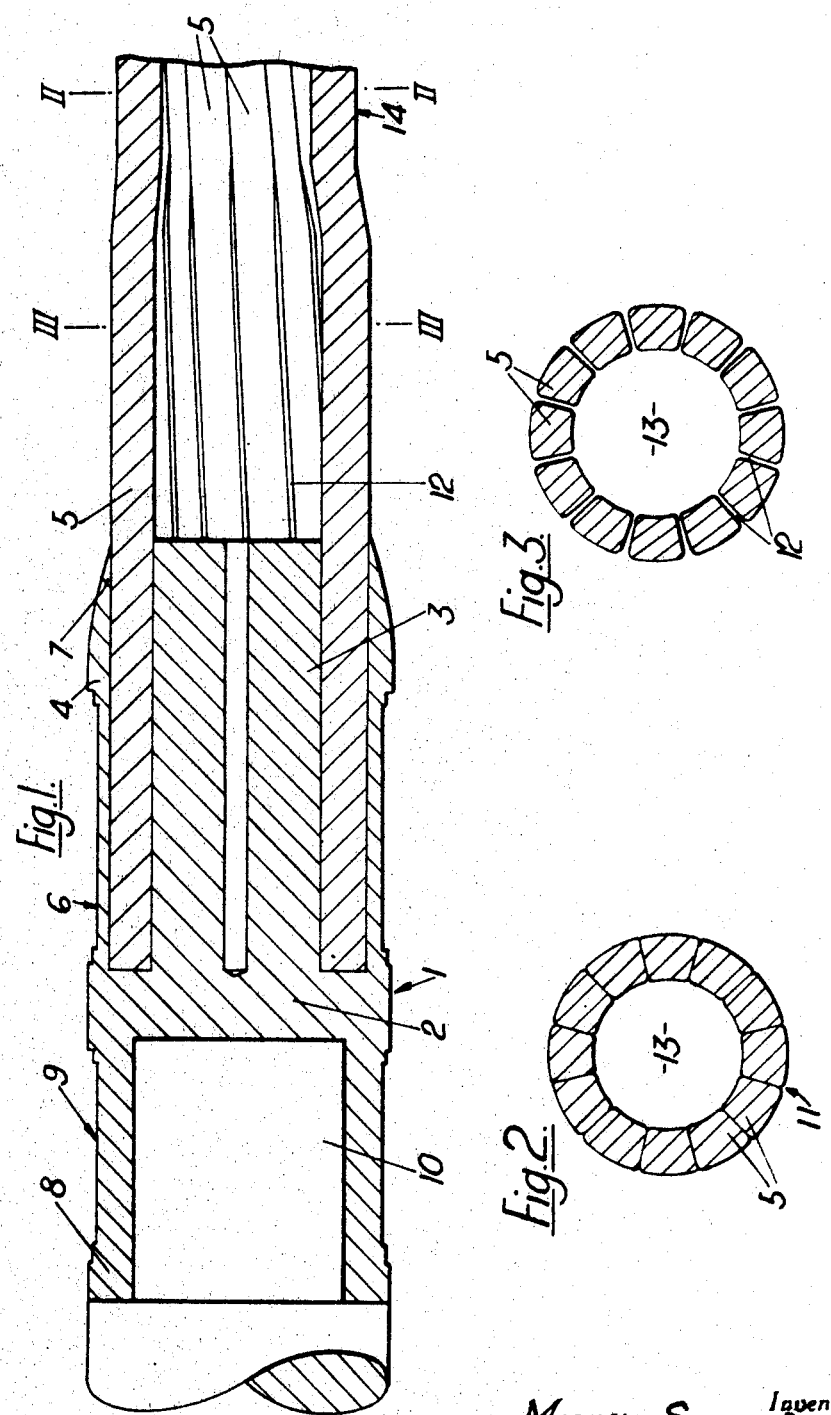

United States Patent Office 3,469,014
Patented Sept. 23, 1969

3,469,014
CONNECTIONS FOR HOLLOW ELECTRIC CONDUCTORS
Michael Savvas Papadopulos, Longfield, Kent, England, assignor to British Insulated Callender's Cables Limited, London, England
Filed May 23, 1967, Ser. No. 640,694
Claims priority, application Great Britain, May 25, 1966, 23,297/66
Int. Cl. H02g *15/24*
U.S. Cl. 174—22                                10 Claims

ABSTRACT OF THE DISCLOSURE

A connection is made to the end of a hollow stranded or segmental electric cable conductor for a fluid-filled cable by forcing an oversize plug into the conductor duct and attaching the separated conductor elements of the conductor to the plug. The spaces thus formed adjacent the plug between the conductor elements allow free flow of fluid into and out of the conductor, for example at a stop joint or oil feed joint or termination, without unduly distorting the field of electrical stress around the joint.

---

This invention relates to joints or terminations for hollow electric conductors of the kind (hereinafter referred to as the kind specified) through which a fluid passes and comprising a number of conductor elements arranged symmetrically around the conductor axis to form a tubular conducting body surrounding a central space for the fluid. The invention is more especially but not exclusively concerned with a method of and apparatus for making connections to hollow conductors of the kind, hereinafter referred to as "segmental," built up from a single annular layer of elements each substantially of a cross-sectional shape bounded by two radii of the annulus making a small angle with each other and two arcs having radii equal respectively to that of the inner and the outer radii of the annulus but having rounded corners.

An object of the invention is to provide a connection for a hollow conductor which allows for local free flow of fluid from the inside to the outside of the conductor and vice versa without unduly changing the configuration of the conductor or a ferrule to which it is connected and hence the field of electrical stress around the conductor and the adjacent part of the ferrule.

The invention is especially applicable to stop joints, between the hollow conductors of fluid-filled cables, that is joints of the kind which provide a barrier to the flow of fluid from one to the other of two hollow conductors connected at the joint, for example stop joints for oil filled cables in which the oil not only serves as part of the dielectric of the cable but also as a cooling medium which circulates through the cable conductors and through external cooling means, since at such stop joints it is necessary to provide a passage or passages for free flow of the fluid, in the cable conductors, into and out of the joint enclosure. The invention includes such joints.

In accordance with the invention a connection is made to a hollow electric conductor of the kind specified by inserting a plug into the end of the conductor which is of sufficiently greater cross-sectional area than the space within the conductor to cause at least some and preferably all of the conductor elements to spread apart from each other, in the region of the connection, to an extent sufficient to provide a number of passages between the elements of an aggregate area sufficient to allow the required flow of fluid.

The conductor elements are secured to the periphery of the plug in any suitable manner, for example by clamping, binding or soldering, but they are preferably secured by fitting a concentric sleeve of ductile metal over the ring of spaced conductor elements, in the region surrounding the plug, and compressing the sleeve.

It is preferred to obtain substantially equal spacing between all of the elements of the conductor by using a plug having the same cross-sectional shape as that of the space within the conductor. The plug may be solid or hollow provided that it has sufficient strength to withstand any force applied to it by the conductor and by whatever form of attachment is employed.

It may be found necessary in some cases to apply to the conductor, adjacent the connection, restraining means which prevent too great a longitudinal spread along the conductor of the spaces between the conductor elements.

We prefer to secure the conductors to the plug by means of a compression joint and to make the sleeve that is compressed onto the elements integral with the plug, since this provides a connection having good electrical conductivity.

Connecting means in accordance with the invention for jointing or terminating a single layer segmental hollow conductor will hereinafter be described by way of example with reference to the accompanying drawing in which:

FIGURE 1 is a vertical section,

FIGURES 2 and 3 are cross-sections on lines II—II and III—III respectively.

The connecting means comprises a tubular ferrule 1 of ductile metal with a central transverse barrier 2 from one side of which an integral cylindrical plug 3 projects along the axis of the ferrule coextensively with an outer part 4 of the ferrule on the same side of the barrier 2. The radial thickness of the annular space between the plug 3 and the part 4 of the ferrule is just sufficient to receive spaced conductor elements 5 and they are secured to the plug by compressing the overlying part 6 of the ferrule by dies of the kind normally used to make a compression joint. The extreme end 7 of this part of the ferrule is tapered to provide a smooth profile where the conductor enters the ferrule.

The part 8 of the ferrule on the opposite side of the barrier 2 is compression jointed at 9 directly to a metal rod 10 forming a connector for jointing the conductor to another similar conductor, which is connected in the same way to the other end of the rod, or to a terminal.

For example, for a conductor 11 made from 12 solid segments 5 having an internal diameter of 2" and an external diameter of 3.18", a suitable diameter for the plug 3 is 2.25", which gives an equal spacing between each of the segments 5 of the conductor of 0.065", measured circumferentially around the external surface of the elements at their point of entry into the ferrule, tapering down to zero spacing in about 8".

My preferred method of spreading the conductor elements is shown in FIGURES 4 and 5 in which, where applicable, the same references are used as in the preceding figures. A two part die consisting of upper and lower parts 15 and 16 is secured to the end of the conductor comprising elements 5 and a correspondingly shaped mandrel 17 is then forced into the conductor duct to cause the elements to adopt the internal shape of the two part die, thus forming the required spaces 12 between the elements 5. The mandrel and die are then removed and the conductor is ready for insertion in the ferrule 1 shown in FIGURE 1.

Connections in accordance with the invention are suitable for use in cable joints in accordance with the copending U.S. application Ser. No. 640,584 filed May 23, 1967.

Comparing FIGURE 1 of the drawing accompanying the specification of that application with FIGURE 1 of the accompanying drawing it will be seen that the ferrule of the present application is considerably shorter, in view of the absence from the barrier 2 of the radial oil ducts 8. The annular space 9 of the stop joint structure would be extended over the part of the conductor 11 of the present application in which there are gaps 12 between the conductor elements 5, to allow free flow of oil through those gaps from the conductor bore 13 into the sinuous passage 18 of the stop joint structure and vice versa.

When it is found necessary to apply restraining means to prevent longitudinal spread, away from the ferrule 1, of the spaces 12, such means will be applied at 14 preferably in such a way as to lie flush with the surface of the conductor. It may, for example comprise a short metal sleeve compressed around the conductor 12 to the extent that it becomes embedded in the surface of the conductor. If necessary, to prevent collapse of the conductor during compression of the sleeve and indentation of the conductor elements, a tubular mandrel will first be inserted into the part of the conductor bore 13 embraced by the sleeve. The sleeve is preferably subsequently covered by built up insulation such as the insulation 21 of the above-mentioned co-pending application.

When the conductor is a segmental conductor of an interlocking type, for example of the kind in which each element is formed on one radial surface with at least one longitudinal groove and on the other radial surface with a rib or ribs mating with the groove or grooves on the adjacent element, it is found to be unnecessary to apply any such restraining means.

The connections have the advantage over known forms of ferrule, provided with radial oil passages in a solid central part of the ferrule, that, particularly when, because a large flow of oil is required, the passages are of large total cross-section they cause less disturbance of the uniform electric field distribution around the joint. For example as compared with a ferrule having four radial oil apertures of the same aggregate cross-section as that of the twelve spaces between the conductors in the example described above, a 50% reduction in stress gradient adjacent to the oil passages in the conductor/ferrule surface can be obtained and consequently the use of a conductor screen, such as the screen 32 of the above mentioned co-pending application, may in some cases be avoided.

What I claim as my invention is:

1. In a joint or termination for a hollow electric conductor
   (a) a conductor formed from a plurality of conductor elements arranged symmetrically around the conductor axis to form a tubular conducting body surrounding a central space for the passage of fluid along the conductor, and a
   (b) connection between the conductor and a conducting body comprising
       (i) a plug, inserted into the end of the conductor of sufficiently greater cross-sectional area than the space within the conductor to cause at least some of the conductor elements to spread apart from each other in the region of the connection to an extent sufficient to provide a number of passages between the elements of an aggregate area sufficient to allow free flow of fluid from the inside to the outside of the conductor, and
       (ii) means for securing the conductor elements to the periphery of the plug.

2. A joint or termination as claimed in claim 1 in which the conductor is a segmental conductor.

3. A joint or termination as claimed in claim 1 in which the conductor is a segmental conductor with interlocking segments.

4. A joint or termination as claimed in claim 1 in which the plug has the same cross-sectional shape as but a greater cross-sectional area than that of the space within the conductor into which it is inserted.

5. A joint or termination as claimed in claim 1 incorporating a ferrule comprising a transverse barrier from at least one side of which an integral cylindrical plug projects along the axis of the ferrule substantially coextensively with an outer part of the ferrule, the spaced ends of the elements of a conductor being compression jointed to the ferrule between said plug and outer part.

6. In a stop joint for fluid-filled cables having hollow electric conductors of the kind comprising a plurality of conductor elements arranged symmetrically around the conductor axis to form a tubular conducting body surrounding a central space for the passage of fluid along the conductor which joint is of the kind comprising
   (a) means for connecting a conductor of each of two cables connected at the joint,
   (b) insulation for said connecting means,
   (c) a barrier for the flow of fluid from one of said conductors to the other,
   (d) a fluid-tight enclosure for said insulation, and
   (e) fluid passages through said insulation on opposite sides of said barrier connecting fluid ports on said enclosure to said conductors; the use of connecting means for said conductors comprising
   (f) a plug inserted into the end of each conductor, which plugs form part of the barrier and are each of sufficiently greater cross-sectional area than the space within the conductor to cause at least some of the conductor elements to spread apart from each other in the region of the connection to an extent sufficient to provide a number of passages between the elements of an aggregate area sufficient to allow free flow of fluid in the conductor into one of said fluid passages through the insulation, and
   (g) means for securing the elements of each conductor to the periphery of the plug inserted therein.

7. A joint as claimed in claim 6 in which each conductor is a segmental conductor.

8. A joint as claimed in claim 6 in which each conductor is a segmental conductor with interlocking segments.

9. A joint as claimed in claim 6 in which each plug has the same cross-sectional shape as but a greater cross-sectional area than that of the space within the conductor into which it is inserted.

10. A joint as claimed in claim 6 incorporating a connector forming part of the barrier, from each end of which cylindrical plug projects along the axis of the connector substantially coextensively with an outer sleeve, the spaced ends of the elements of a conductor being compression jointed to the connector between said plug and said outer sleeve.

References Cited
UNITED STATES PATENTS

| | | | |
|---|---|---|---|
| 2,967,899 | 1/1961 | Priaroggia | 174—22 |
| 3,051,770 | 8/1962 | Palmieri | 174—22 |
| 2,089,052 | 8/1937 | Calvert | 174—15 |
| 2,967,901 | 1/1961 | Priaroggia | 174—22 X |

LEWIS H. MYERS, Primary Examiner

A. T. GRIMLEY, Assistant Examiner

U.S. Cl. X.R.

174—88, 89